Patented July 4, 1950

2,514,218

UNITED STATES PATENT OFFICE 2,514,218

PRESERVING RUBBER

Harry E. Albert, Akron, Ohio, assignor to The Firestone Tire & Rubber Company, Akron, Ohio, a corporation of Ohio No Drawing. Application March 20, 1946, Serial No. 655,885

10 Claims. (Cl. 260—810)

This invention relates to compositions of natural rubber which contain antiflex-cracking agents.

The flexing of rubber, such as that which takes place in the side walls of a tire, causes the formation of cracks in the rubber. These cracks may ultimately cause failure of the tire side wall. Relatively recently, compounding ingredients have been selected because of their tendency to reduce the formation of cracks on flexing. These agents are known as antiflex-cracking agents.

The tendency toward crack formation has been particularly pronounced in white side-wall tires. Some good antiflex-cracking agents are not suitable for use in white side walls because of their tendency to discolor. The antiflex-cracking agents of this invention are particularly valuable because they do not discolor a white rubber composition, or any discoloration which takes place is slight compared to that which takes place with the commercial antiflex-cracking agents.

According to this invention alkylated naphthols are used as antiflex-cracking agents. The alkylated beta-naphthols are preferred and particularly those which contain a tertiary alkyl group.

The substitution of the one or more alkyl substituents in the nucleus apparently affects the compound so as to retard or stop discoloration. In general, an alkylated naphthol containing a single substituent is more satisfactory than one which contains more substituents, and the alkylated beta-naphthols are more satisfactory than the alkylated alpha-naphthols. Mono-alkylation probably introduces substituents into the 1 or 4 position of beta-naphthol. The invention includes the use of polyalkylated naphthols as well as the mono- and di-alkylated naphthols which are generally preferred. The alkyl substituent or substituents may contain one up to twenty or more carbon atoms. Representative compounds include, for example:

Methyl-beta-naphthol
Dimethyl-beta-naphthol
Tertiary-octyl, methyl-beta-naphthol
Cyclohexyl-beta-naphthol
Dodecyl-beta-naphthol
Cetyl-beta-naphthol
Tetraethyl-beta-naphthol
Di-tertiary-butyl, methyl-beta-naphthol
Di-tertiary-octyl-alpha-naphthol
Dimethyl-alpha-naphthol
Tetraethyl-alpha-naphthol
Oleyl-beta-naphthol The following examples illustrate the preparation of the alkylated naphthols.

EXAMPLE 1

Tertiary-octyl-beta-naphthol

Diisobutylene is caused to react with beta-naphthol in equimolecular proportions in the presence of 94 per cent sulfuric acid. (The reaction is described in Hester U. S. 2,008,017.) Purification is effected by extraction with alkali followed by distillation and recrystallization from gasoline or from recrystallization alone. Tertiary-octyl-beta-naphthol was obtained as a white crystalline material, the melting point being about 126–127.5° C., uncorrected.

EXAMPLE 2

Heptyl-beta-naphthol

Equimolecular proportions of beta-naphthol and 100 per cent excess of mixed heptenes were reacted in the presence of 94 per cent sulfuric acid at 60–70° C. for about 4 hours. The product was purified by alkali extraction and distillation. The mixed heptyl-beta-naphthols thus obtained boiled at 160–200° C. at 1.5 mm. They were a pale viscous liquid which gradually solidified on standing.

EXAMPLE 3

Tertiary-butyl-beta-naphthol

Equimolecular proportions of tertiary-butyl chloride and beta-naphthol were reacted in the presence of zinc chloride at 45–50° C. for 18 hours. Dry gasoline was used as the solvent. The product was purified by alkali extraction and recrystallization from gasoline. Tertiary-butyl-beta-naphthol was thus obtained as a white crystalline material with a melting point of 117–118° C., uncorrected.

EXAMPLE 4

Di-tertiary-butyl-beta-naphthol

Two mols of tertiary-butyl chloride and one mol of beta-naphthol were reacted in the presence of zinc chloride until the evolution of hydrogen chloride virtually stopped. Then aluminum chloride was added to complete the reaction. The product was purified by water extraction, alkali extraction, and recrystallization from gasoline. Di-tertiary-butyl-beta-naphthol was obtained as white crystals melting at 132.5 to 133° C., uncorrected.

EXAMPLE 5

Di-tertiary-butyl-alpha-naphthol

This was prepared by reacting two mols of tertiary-butyl chloride with one mol of alpha-naphthol in the presence of zinc chloride. The product was purified by water extraction, alkali extraction, and recrystallization. Di-tertiary-butyl-alpha-naphthol was thus obtained as white crystals having a melting point of 141–141.5° C., uncorrected.

Alkylated naphthols prepared as above were compounded in rubber according to the following formula and then subjected to flex-cracking and discoloration tests, the results of which are recorded below. The formula to which the rubber was compounded is:

| | |
|---|---|
| Pale crepe rubber | 100 |
| Sunproof wax | 2 |
| Ultramarine | 0.10 |
| Zinc oxide | 71.50 |
| Titanium oxide pigment | 20 |
| Sulfur | 3.10 |
| Stearic acid | 1.20 |
| Altax | 0.38 |
| Barak | 0.48 |
| Antiflex-cracking agent | 1 |

The wax of the above formula was of the type ordinarily employed to produce a slight bloom on a white side wall. The Altax (benzothiazyl disulfide) is an accelerator. The Barak (dibutyl ammonium oleate) is an activator for the accelerator.

Two series of tests using different alkyl naphthols were carried out to compare the antiflex-cracking properties of rubber compositions containing the alkylated naphthols with rubber similarly compounded which contained no antioxidant or antiflex-cracking agent. The results of the tests are recorded below. The tests consisted of flexing ½ inch 100-gauge dumbbell strips cut from slabs cured 40 and 60 minutes at 200° F. until all the strips were broken. Two strips of each cure of each stock were used, making a total of four strips for each vulcanizate. The "Flex Life" as recorded in the following tables was determined by totaling the flex lives of the four strips; that is, the length of time in hours required to break the four strips on a sidewall flex machine especially designed for the purpose. The cracks in each strip were counted after flexing to break, and the total number of cracks found in the four strips of each stock were totaled to obtain the "Number of Cracks" recorded in the tables below. The column entitled "Rate of Crack Formation" is the average rate of crack formation obtained by dividing the total number of cracks for each stock by the total flex life in hours. The last two columns in each table give the per cent improvement in flex life and per cent improvement in rate of crack formation of each vulcanizate compared with the blank.

| Antiflex-cracking Agent | Number of Cracks | Flex Life | Rate of Crack Formation | Improvement in Flex Life | Improvement in Rate of Crack Formation |
|---|---|---|---|---|---|
| | | | | Per cent | Per cent |
| Di-tertiary-butyl-alpha-naphthol | 98 | 34.58 | 2.83 | 64 | 5 |
| Di-tertiary-butyl-beta-naphthol | 72 | 29.53 | 2.44 | 40 | 18 |
| Tertiary-butyl-beta-naphthol | 29 | 39.82 | 1.98 | 89 | 34 |
| Heptyl-beta-naphthol | 94 | 35.33 | 2.99 | 71 | 0 |
| Blank | 63 | 21.05 | 2.99 | | |
| Tertiary-octyl-beta-naphthol | 105 | 44.95 | 2.35 | 91 | 38 |
| Blank | 89 | 23.20 | 3.79 | | |

The same stocks were subjected to artificial and natural weathering tests together with a stock similarly compounded with a widely used antioxidant (phenyl-beta-naphthylamine), and the discoloration produced in the various stocks was compared with the discoloration of a stock containing no antioxidant or antiflex-cracking agent. The artificial exposure test consisted in exposure for 28 hours in a weatherometer with no filters. The natural weathering tests were conducted from April to June in Florida. For each of the tests, stocks cured for 40 and 60 minutes at 280° F. were tested. In the following tables the actual colors are recorded, and the table for the artificial exposure test includes a comparison of the actual colors with the colors of a blank which contained no antiflex-cracking agent:

Artificial exposure test

| Antiflex-cracking Agent | 40-Minute Cure | | 60-Minute Cure | |
|---|---|---|---|---|
| | Color | Comparison With Blank | Color | Comparison With Blank |
| Di-tertiary-butyl-alpha-naphthol | white | very slightly discolored. | very light cream | slightly discolored. |
| Di-tertiary-butyl-beta-naphthol | do | do | do | Do. |
| Tertiary-butyl-beta-naphthol | very light cream | slightly discolored | light cream | Do. |
| Tertiary-octyl-beta-naphthol | do | do | do | Do. |
| Heptyl-beta-naphthol | do | do | very light cream | Do. |
| Phenyl-beta-naphthylamine | brown | very badly discolored. | brown | very badly discolored. |

Natural weathering

| Antiflex-cracking Agent | 40-Minute Cure | 60-Minute Cure |
|---|---|---|
| Di-tertiary-butyl-alpha-naphthol | very light cream. | very light cream. |
| Di-tertiary-butyl-beta-naphthol | do | Do. |
| Tertiary-butyl-beta-naphthol | light cream | light cream. |
| Tertiary-octyl-beta-naphthol | do | Do. |
| Heptyl-beta-naphthol | do | Do. |
| Phenyl-beta-naphthylamine | tan | tan. |

It is evident from the above comparisons that the discoloration caused by the alkylated naphthols is very slight compared to that caused by a representative antioxidant of the amine type.

The above examples are illustrative. The antiflex-cracking effect of the various alkylated naphthols is not dependent upon the presence of titanium oxide or other compounding ingredient. The amount of the antiflex-cracking agent used may vary but, in general, will be between the limits of 0.1 per cent and 10 per cent, based on the amount of the rubber. The invention is defined in the appended claims.

What I claim is:

1. Natural rubber vulcanizate which contains as an antiflex-cracking agent about 0.1 to 10 per cent of an alkylated naphthol.

2. Natural rubber vulcanizate which contains as an antiflex-cracking agent a small amount of an alkylated beta-naphthol.

3. Natural rubber vulcanizate which contains as an antiflex-cracking agent a small amount of a tertiary-alkyl-beta-naphthol.

4. A white natural rubber vulcanizate pigmented heavily with white pigment so as to be light in color, which contains as an antiflex-cracking agent a small amount of an alkylated beta-naphthol.

5. A white natural rubber vulcanizate pigmented heavily with white pigment so as to be light in color, which contains as an antiflex-cracking agent a small amount of a tertiary-alkyl-beta-naphthol.

6. A white natural rubber vulcanizate pigmented heavily with white pigment so as to be light in color, which contains as an antiflex-cracking agent a small amount of a tertiary-butyl-beta-naphthol.

7. A white natural rubber vulcanizate pigmented heavily with white pigment so as to be light in color, which contains as an antiflex-cracking agent a small amount of tertiary-octyl-beta-naphthol.

8. The process of preparing a natural rubber vulcanizate which comprises curing natural rubber compounded with vulcanizing ingredients including sulfur, and as an antiflex-cracking agent about 0.1 to 10 per cent of an alkylated beta-naphthol.

9. The process of preparing a natural rubber vulcanizate which comprises curing natural rubber compounded with vulcanizing ingredients including sulfur, and as an antiflex-cracking agent about 0.1 to 10 per cent of a tertiary-alkyl-beta-naphthol.

10. The process of preparing a natural rubber vulcanizate which comprises curing natural rubber compounded with (1) vulcanizing ingredients including sulfur, (2) sufficient white pigment to give the vulcanizate a light color, and (3) as an antiflex-cracking agent about 0.1 to 10 per cent (based on the rubber) of an alkylated naphthol.

HARRY E. ALBERT.

REFERENCES CITED

The following references are of record in the file of this patent:

UNITED STATES PATENTS

| Number | Name | Date |
|---|---|---|
| 1,717,093 | Clifford | June 11, 1929 |
| 1,841,342 | Teppema | Jan. 12, 1932 |
| 2,334,470 | Armstrong | Nov. 16, 1943 |

FOREIGN PATENTS

| Number | Country | Date |
|---|---|---|
| 497,418 | Great Britain | June 20, 1936 |